(12) United States Patent
Harris (10) Patent No.: US 9,506,577 B2
(45) Date of Patent: Nov. 29, 2016

(54) SAFETY VALVE DEVICE

(71) Applicant: Tilden C. Harris, Saint Gabriel, LA (US)

(72) Inventor: Tilden C. Harris, Saint Gabriel, LA (US)

(*) Notice: Subject to any disclaimer, the term of this patent is extended or adjusted under 35 U.S.C. 154(b) by 70 days.

(21) Appl. No.: 14/265,869

(22) Filed: Apr. 30, 2014

(65) Prior Publication Data

US 2014/0318651 A1    Oct. 30, 2014

Related U.S. Application Data

(60) Provisional application No. 61/817,391, filed on Apr. 30, 2013.

(51) Int. Cl.
*F16K 17/40* (2006.01)
*F16K 17/36* (2006.01)
*F16K 1/30* (2006.01)

(52) U.S. Cl.
CPC ............ *F16K 17/366* (2013.01); *F16K 1/305* (2013.01); *Y10T 137/86815* (2015.04); *Y10T 137/86879* (2015.04); *Y10T 137/87925* (2015.04); *Y10T 137/9029* (2015.04)

(58) Field of Classification Search
CPC ................. F16K 17/366; F16K 1/305; Y10T 137/86879; Y10T 137/87925; Y10T 137/9029; Y10T 137/86815
USPC ........... 137/68.14; 138/39, 40; 251/118, 127
See application file for complete search history.

(56) References Cited

U.S. PATENT DOCUMENTS

| | | | | |
|---|---|---|---|---|
| 3,072,261 A | * | 1/1963 | Smith | F15B 21/041 138/42 |
| 3,252,622 A | * | 5/1966 | Puster | B67D 1/0412 138/40 |
| 3,930,517 A | * | 1/1976 | Gagala | F17C 13/04 137/329.4 |
| 3,986,439 A | * | 10/1976 | Ring | F15D 1/00 138/40 |
| 3,995,356 A | * | 12/1976 | Sheppard | B23P 15/16 138/40 |
| 4,077,422 A | | 3/1978 | Brinkley et al. | |
| 4,562,852 A | | 1/1986 | Britt | |
| 4,606,367 A | | 8/1986 | Britt | |
| 4,762,140 A | | 8/1988 | Davis | |
| 4,886,087 A | | 12/1989 | Kitchen | |

(Continued)

FOREIGN PATENT DOCUMENTS

GB            2250609 A  *  6/1992  ........ F16L 55/02718

*Primary Examiner* — Mary McManmon
*Assistant Examiner* — Minh Le
(74) *Attorney, Agent, or Firm* — Robert Devin Ricci; Kean Miller, LLP (57) ABSTRACT

A safety valve device as for use with a compressed gas cylinder and/or a control valve comprising a housing unit, a plug with controlled bleed off channels bored into the plug, an actuator, and an actuating rod, which is designed to engage in the event that a control valve is severed from a compressed gas cylinder, at least partially sealing the opening formed in the compressed gas cylinder from the severing of the control valve, and achieving a safer, controlled bleed off of the compressed gas contained therein.

47 Claims, 6 Drawing Sheets

(56) References Cited

U.S. PATENT DOCUMENTS

| | | | | |
|---|---|---|---|---|
| 4,907,617 | A * | 3/1990 | Whalen | F16K 17/406 137/68.11 |
| 5,022,423 | A | 6/1991 | Britt | |
| 5,103,860 | A * | 4/1992 | Morris | F16K 17/34 137/460 |
| 5,144,973 | A * | 9/1992 | Green | F16K 17/40 137/513.3 |
| 5,350,266 | A * | 9/1994 | Espey | B62J 23/00 403/375 |
| 5,505,229 | A * | 4/1996 | Lee, II | F16L 55/027 138/40 |
| 5,894,859 | A | 4/1999 | Pavlicek | |
| 5,941,268 | A | 8/1999 | Ross, Jr. | |
| 6,071,084 | A * | 6/2000 | Wass | F04F 5/463 137/888 |
| 6,431,197 | B2 | 8/2002 | Hintzman et al. | |
| 6,502,979 | B1 * | 1/2003 | Kozyuk | B01F 5/08 366/176.2 |
| 6,799,596 | B2 * | 10/2004 | Liebert | F16K 17/406 137/68.14 |
| 7,207,712 | B2 * | 4/2007 | Kozyuk | B01F 3/0807 138/40 |
| 7,418,974 | B2 * | 9/2008 | Kremer | F17C 1/00 137/614.2 |
| 7,828,006 | B2 * | 11/2010 | Bai | F17C 13/04 137/68.12 |
| 8,485,910 | B2 * | 7/2013 | Selle | B23K 11/14 411/177 |
| 2007/0074759 | A1 * | 4/2007 | McClung, Jr. | F16K 17/34 137/68.14 |
| 2008/0196766 | A1 | 8/2008 | Gandy | |
| 2013/0220442 | A1 * | 8/2013 | Balutto | F16K 24/042 137/202 |

* cited by examiner

FIG. 6

US 9,506,577 B2

SAFETY VALVE DEVICE

CROSS REFERENCE TO RELATED APPLICATIONS

This application claims the benefit of U.S. Provisional Patent Application No. 61/817,391 filed on Apr. 30, 2013. The disclosures of the referenced application are hereby incorporated herein in their entirety by reference.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

BACKGROUND

Compressed gas cylinders and tanks are normally equipped with an access or control valve which regulates the flow of the compressed gas leaving the cylinder or tank. Conventionally, this access or control valve is axially connected to one end of the cylinder or tank at an access port. If the tank were to fall, get knocked over, or otherwise cause the valve to come into contact with an external force, the valve may be broken off, ruptured, or otherwise separated from the tank at the point of connection. The pressure of the uncontrolled gas venting from the tank as a result of such separations creates a great hazard.

For example, if the neck of a pressurized cylinder should be accidentally broken off, the energy released may be sufficient to propel the cylinder in the fashion of a torpedo or other projectile. It is estimated that a standard 250 cubic foot cylinder pressurized to 2,500 PSIG can become a rocket attaining a speed of over 30 miles per hour in a fraction of a second after venting from the broken cylinder connection. It is further estimated that an 80 cubic foot cylinder filled to 3000 psi (207 bar) has in excess of one million pounds of kinetic energy; power sufficient to blow apart brick walls, destroy vehicles, and injure or kill people.

In addition to the torpedo or projectile hazard, compressed gas cylinders are also known to topple over and laterally spin in circles when the control valve is ruptured from a tank. This presents an additional hazard as the spinning cylinder could potentially knock a standing person off his or her feet, and continue to barrage or forcefully contact that person causing grave injury. For example, a human user may accidentally knock over a compressed gas cylinder during use by accidentally pulling too hard on a gas tube connected to the control valve of the cylinder. While falling over, the compressed gas cylinder control valve may come into contact with a work bench or other external force, causing the valve to separate from the cylinder. At this point in time, the highly compressed gas will vent from the cylinder at a high pressure and rate, causing the cylinder to start spinning. Because these events can occur in a matter of seconds, the human user may not have the ability to react quickly enough to remove himself from the circular path of the cylinder's spinning. Thus, the user's feet could be taken out from underneath the user, causing the user to fall over and sustain injury. It is further possible that the user may fall into the path of the spinning cylinder and incur even more grievous injuries.

Many attempts have been noted which aim to solve the "torpedoing" and "spinning" issues mentioned above. However, to do so, the prior art attempts essentially utilize plugs to completely stop the venting of gas from the cylinder. The reality is that the "solution" proposed by the prior art actually produces an additional, novel problem by creating a plugged compressed gas cylinder which lacks a controllable valve to release the pressurized gas therein. A person having ordinary skill in the art would recognize that a compressed gas cylinder without a controllable release valve is potentially a greater hazard than is the torpedoing cylinder and may even liken such a tank to a bomb, or bomb-in-waiting. The present invention seeks to address and provide a solution for all three of these issues.

DESCRIPTION OF THE DRAWINGS

The drawings constitute a part of this specification and include exemplary embodiments of the safety valve device, which may be embodied in various forms. It is to be understood that in some instances, various aspects of the safety valve device may be shown exaggerated or enlarged to facilitate an understanding of the device. Therefore the drawings may not be to scale.

DISCLOSURE

The disclosed safety valve device aims to solve the aforementioned safety issues regarding compressed gas tanks. To solve these issues, multiple embodiments of a safety valve device are provided which allows for a controlled bleed off of the contents of a compressed gas tank in the event that an access valve is separated from the tank, causing a breach in the tank. In one embodiment, a safety valve device is provided comprising a housing structure, a plug, a spring, and an actuating rod, wherein at least one controlled bleed off vein is bored into the plug. As used herein, the term "controlled bleed off" means a decrease in the flow rate of an output stream from a tank as compared to an uninhibited flow rate. As used herein, the term "output stream" refers to the stream of movement of the tank's gaseous contents to the ambient atmosphere through an access port in the tank. As used herein, the term "controlled bleed off vein" is defined to mean a channel bored into or otherwise formed in the plug in such a manner as to act as a conduit between the interior of a compressed gas tank and the ambient atmosphere which facilitates a controlled bleed off when the plug is in the activated position. As used herein, the term "controlled bleed off channel" means the channel or conduit formed between the interior of a tank and the ambient atmosphere which facilitates a controlled bleed off of the output stream. As used herein, the term "plug" means a device or object which is capable of forming at least a partial seal when in the "activated position" so as to facilitate a controlled bleed off of the output stream. As used herein, the term "activated position" refers to the position of the plug valve when the plug is forming at least a partial seal with an opening or passageway through which the output stream could exit the tank which facilitates or achieves a controlled bleed off of the output stream. As used herein, the term "inactivated position" refers to the position of the plug valve when the plug does not substantially restrict the flow of the output stream by forming a partial seal. As used herein the term "compressed gas tank" refers to any canister, cylinder, tank, or other housing means for storing a gas at a pressure differential to the ambient atmosphere. As used herein the term "access port" in reference to a compressed gas tank refers to any breach, opening, or port in the structure of the compressed gas tank through which an output stream could flow.

Having reviewed the contents of this specification, one having ordinary skill in the art would recognize that multiple configurations of controlled bleed off veins and controlled bleed off channels could be utilized to facilitate an intended rate of a controlled bleed off. In one of the most basic embodiments, the safety valve device comprises a housing unit, a plug, an actuator, and an actuating rod, wherein the plug is capable of forming at least a partial seal with the housing unit and comprises at least one controlled bleed off vein. Various embodiments of the safety valve device allow for the use or mechanical and non-mechanical actuators which shift the plug into the activated position when a controlled bleed off is desired, such as when the valve is separated from the tank and/or housing unit. The output stream passing through the housing unit could act as an actuator if the pressure exerted on the plug by the stream is sufficient to move the plug to the activated position. However, mechanical actuators, such as springs, provide additional fail-safe's which ensure that the plug enters the activated position. Therefore, in another embodiment, the safety valve device comprises a housing unit, a plug, a mechanical actuator such as a spring, and an actuating rod, wherein the plug is capable of forming at least a partial seal with the housing unit and comprises at least one controlled bleed off vein, and wherein a controlled bleed off channel is formed when the plug is in the activated position. In at least one embodiment, the housing unit is housed inside the compressed gas tank during operation.

In another embodiment, the safety valve device comprises a housing unit, a plug, a spring, and an actuating rod, wherein the plug comprises at least one controlled bleed off vein, wherein the plug contacts the spring, and wherein the plug, spring, and a portion of the actuating rod are housed inside the housing unit when the plug is in the inactivated position. The housing unit has at least one inlet port and an outlet or output port which allows the output stream to pass through the housing unit. The actuating rod has two ends wherein one end is housed inside an access valve attached to a compressed gas tank and contacts or abuts a valve seat located inside of the access valve and the other end is housed inside the housing unit and contacts the plug either directly or indirectly when the plug is inactivated. The spring exerts a force which pushes the plug towards the activated position. During normal use, the valve is connected to the tank and contact between the valve seat and the actuating rod counters or resists the force from the actuator which pushes the plug to the activated position. If the valve and valve seat were severed or otherwise sufficiently separated from the tank and housing unit, the actuating rod and valve seat would cease to counter the force exerted by the actuator, and the plug would shift to the activated position allowing for a controlled bleed off of the tank's contents to be achieved. In yet an additional embodiment, the housing unit further comprises a housing unit output shoulder, wherein the plug contacts and forms at least a partial seal with the housing unit output shoulder when the plug is in the activated position.

In one embodiment, a housing unit is provided comprising a gas channel, at least one intake, an outlet, and a platform with a cross section across the outlet upon which the spring can rest such that it is capable of exerting a force on the plug to activate the plug. In a related embodiment, the platform is in the shape of a cross. In another embodiment, the housing unit comprises a body, a bottom intake, a top outlet, at least one side intake, and a platform, wherein the platform has a cross section upon which the spring can rest such that it is capable of exerting a force on the plug to activate the plug and wherein the platform is capable of allowing the contents of the tank to pass there through. In another embodiment, the housing unit comprises a body, at least one intake, an outlet, and a platform upon which the spring can rest such that it is capable of exerting a force on the plug towards the activated position, wherein the platform is provided by a cap which is attached to the bottom of the housing unit. In another embodiment, the cap has an intake hole which allows for the flow of the tank's contents through the cap and into the housing unit.

In one embodiment, the housing unit is diametrically smaller than the valve slot on the tank to allow for the housing unit to allow for easier installation or removal of the housing unit. In one embodiment, the housing unit is diametrically larger than the width or diameter of each of the plug, spring and actuating rod. In one embodiment, the housing unit comprises an attachment means which allows for the housing unit to attach to a compressed gas tank. In a further embodiment, the housing unit comprises an attachment means which allows for the housing unit to attach to a control valve. In one embodiment, one or more of the housing unit attaching means comes in the form of threading. In another embodiment, the housing unit is externally threaded on one end to allow for connection to an internally threaded valve. In another embodiment, the housing unit is externally threaded on one end to allow for connection of the housing unit to the internal threading of a tank's valve slot. In yet another embodiment, the housing unit is externally threaded on one end to allow for the connection of the housing unit to both a tank and a control valve. In yet another embodiment, the housing unit is threaded on one end to allow for the connection of a cap. In yet another embodiment, the housing unit is externally threaded to allow for the connection of an adapter which has corresponding internal threading. In one embodiment, the adapter is a gas mixing tube adapter and the gas mixing tube adapter is structured so as to allow for a gas mixing tube to be connected to the housing unit through the gas mixing tube adapter. In yet another embodiment, the housing unit is externally threaded to allow for the direct connection of a mixing tube to the housing unit.

Multiple configurations of attachment means are envisioned for the safety valve device, depending on various factors including the tanks, valves or various adapters with which the device is to be used. In one embodiment, the housing unit comprises a top threading, a middle threading, and a bottom threading. In another embodiment, the housing unit comprises an external threading on one end of the housing unit and an external threading located between the ends of the housing unit. In another embodiment, the housing unit comprises a top external threading, a middle threading, and a bottom threading. In a related embodiment, the bottom threading is an external threading which allows for the attachment of a cap with corresponding internal threading. In a related embodiment, the bottom threading is an internal threading which is used to attach a cap with corresponding external threading to the housing unit.

In one embodiment, the safety valve device comprises a housing unit, a rod, a plug, and a spring, the housing unit is a tubular housing unit, the plug is a ball valve, the plug comprises at least one controlled bleed off vein bored or otherwise formed into the plug such that at least one controlled bleed off channel is formed when the plug is in the activated position, the actuating rod is a metallic pin, and the spring is a compression spring. In one embodiment, the housing unit comprises a gas channel, at least one intake, an outlet, and a platform with a cross section upon which the spring can rest such that it is capable of exerting a force on the plug to activate the plug. In a related embodiment, the platform is in the shape of a cross which allows for at least one opening through which gas can enter the housing unit from the tank. In another embodiment, the housing unit comprises a body, a bottom intake, a top outlet, at least one side intake, and a platform, wherein the platform has a cross section upon which the spring can rest such that it is capable of exerting a force on the plug to activate the plug and wherein the platform is capable of allowing the contents of the tank to pass there through. In another embodiment, the housing unit comprises a body, at least one intake, an outlet, and a platform upon which the spring can rest such that it is capable of exerting a force on the plug to activate the plug, wherein the platform is provided by a cap which is attached to the bottom of the housing unit. In another embodiment, the cap has an intake hole which allows for the flow of the tank's contents through the cap and into the housing unit.

In one embodiment, the housing unit is a tubular housing unit, the plug is a ball valve, at least one controlled bleed off vein is bored into the plug such that at least one controlled bleed off channel is formed when the plug is activated, the actuating rod is a metallic pin, and the spring is a compression spring.

Multiple embodiments of the safety valve device are provided herein. It should be understood that no limitations on the scope of the invention are intended by describing these embodiments. One of ordinary skill in the art will readily appreciate that alternate but functionally equivalent components, materials, designs, and equipment may be used. One of ordinary skill in the art will likewise readily appreciate that various components of the multiple embodiments described herein could be used together to create a different embodiment from those which are described. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention. The term actuating rod should likewise not be used to limit the scope of the invention. As described herein, the actuating properties of the actuating rod demonstrate that the absence of the opposing or resisting force exerted by the presence of the primary valve onto the plug through the actuating rod to counter the opposing force of the spring exerted onto the plug allows for the plug to be moved to the activated position. Therefore, the term activating rod could be switched to a stopper rod or stopper pin without changing the scope of the safety valve device.

DETAILED DESCRIPTION

The subject matter of the present invention is described with specificity herein to meet statutory requirements. However, the description itself is not intended to necessarily limit the scope of claims. Furthermore, the described features, structures, or characteristics may be combined in any suitable manner in one or more embodiments. In the following description, numerous specific details are provided, such as examples of plugs, housing units, actuating rods, valves and component materials. One skilled in the relevant art will recognize, however, that the safety valve device may be practiced without one or more of the specific details, or with other components, materials, and so forth. In other instances, well-known structures, materials, or operations are not shown or described in detail to avoid obscuring aspects of the invention.

The Depicted Parts

Figure 1:
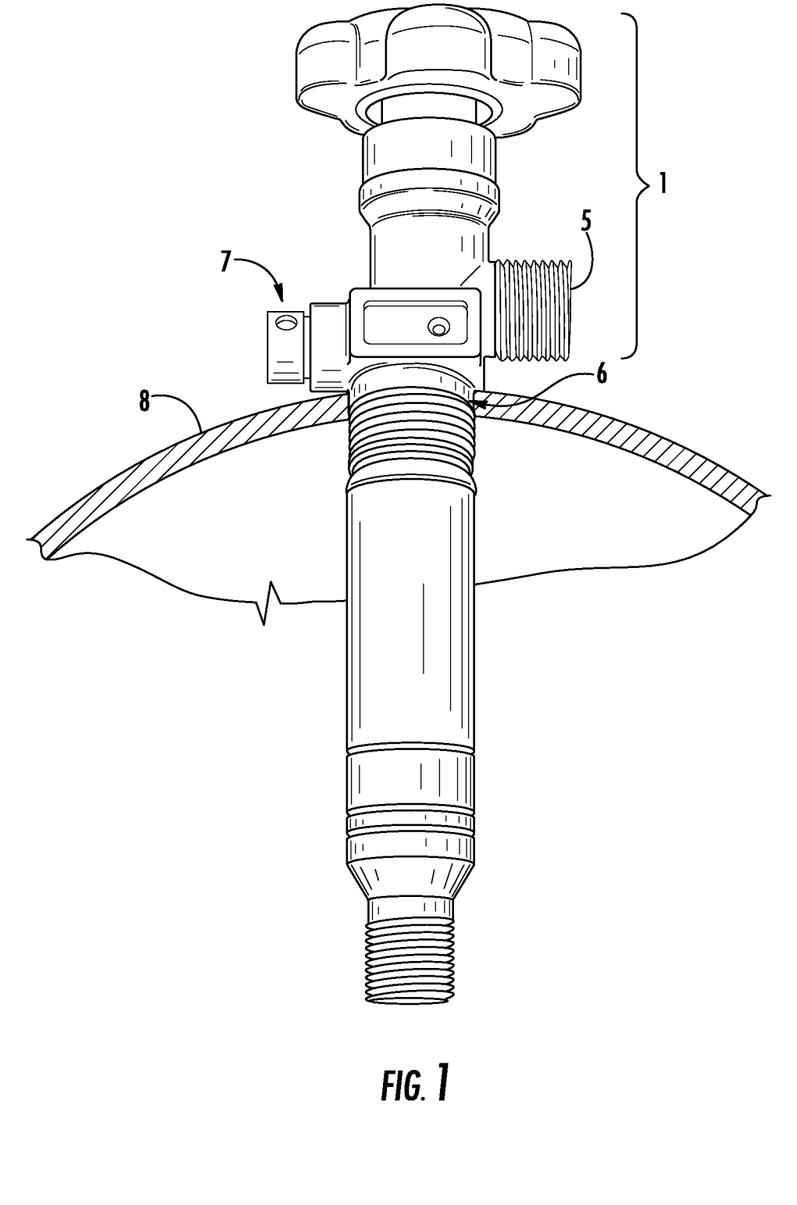
FIG. 1 is a drawing depicting an embodiment of the safety valve device connected to a primary compressed gas tank valve and coupled to a mixing gas tube adapter.
Figure 2:
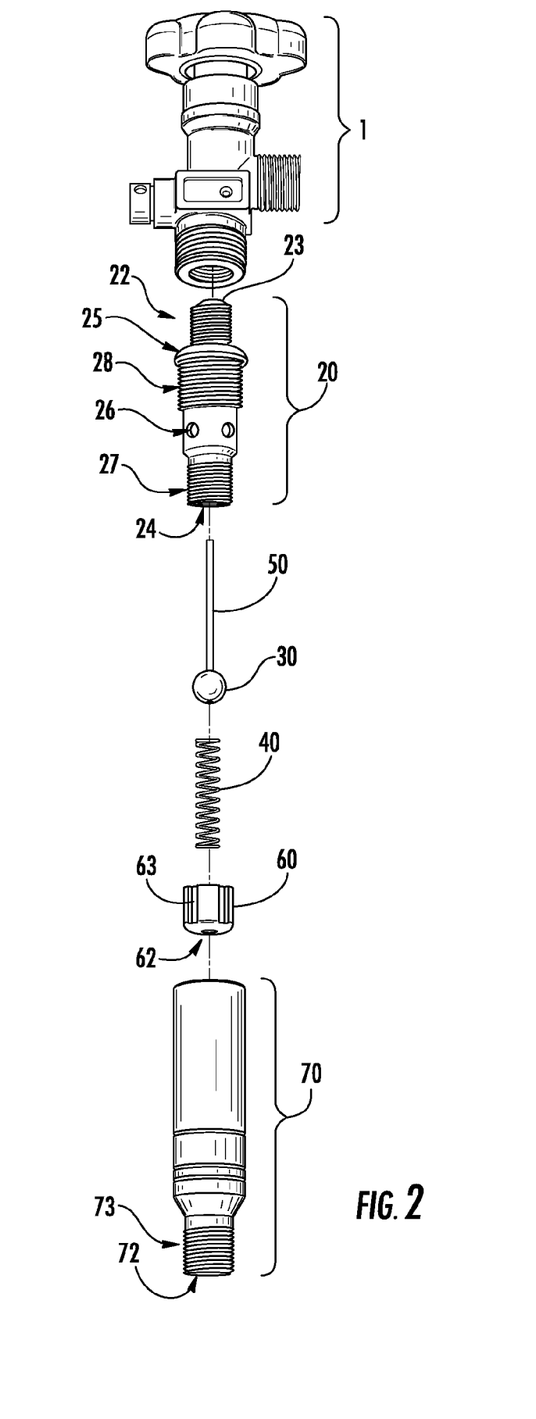
FIG. 2 is an exploded view depicting the component parts of one embodiment of the safety valve device.

As shown in the exploded perspective view of FIG. 2, one embodiment of the safety valve device comprises a housing unit 20, a plug 30, an actuator spring 40, and an actuating rod 50, wherein, during normal operations, actuating rod 50 extends from the valve seat 2 inside the primary valve 1 into housing unit 20. The actuating rod 50 contacts plug 30 when plug 30 is in the inactivated position. The safety valve device can be fitted to couple with many types and sizes of compressed gas tanks and associated valves, thereby creating a gas regulation system. The typical tank valves represented by primary valve 1 utilize a valve nut 4 to open and close the valve chamber passageway, thereby regulating the flow of gas. The user manipulates the valve handle 3, causing valve nut 4 to open and close the valve channel passageway. The base of valve nut 4 facing the tank opening is valve seat 4 which contacts actuating rod 50 during normal operation.

Housing unit 20 provides the general structure for the safety valve device and houses a majority of the components which allow the safety valve device to function. Housing unit 20 generally comprises a housing unit gas channel 21, a securing means to compressed gas tank and primary valve 22, gas output port 23, at least one gas intake from compressed gas tank port (depicted as 24, 26, or both 24 and 26), housing unit output shoulder 25, and optional other securing means which allow for the attachment of the housing unit to various other components such as a gas mixing tube adapter 70 and a housing unit securing means to cap 27. Gas channel 21 is a channel though which gas flows from the tank into the housing unit 20 through at least one gas intake from compressed gas tank port 24 or 26, and out of gas output port 23. Therefore, gas channel 21 is a channel formed between the gas intake ports and output port that is formed by the walls of housing unit 20.

Housing unit 20 is generally comprised of a metallic material or metal alloy which is not reactive with the contents of the tank. Depending on the gas contents of the compressed gas tank and/or on intended use, the housing unit may be comprised of a non-corrosive metal. One having ordinary skill in the art would recognize that the housing unit 20 could comprise one of many different types of metals or combinations of metals and metal alloys so long as the housing unit 20 is constructed such that it (1) is structurally capable of withstanding the pressure that will be exerted onto the housing unit by the output stream as well as the internal pressure of the compressed gas tank, and (2) is not reactive with the contents of the tank. Several metals are capable of being used to construct the housing unit including, but not limited to, brass, copper, aluminum, iron, steel, stainless steel, graphite, platinum, titanium, silver, lead, silicon bronze, manganese bronze, cadmium, zinc, magnesium, and alloys of any of the foregoing. Likewise, the housing unit can be comprised of a non-metal such as polyvinyl chloride (PVC), polyethylene or a similar plastic. In the depicted embodiment, the housing unit 20 is of a unitary construction. However, the depiction should not be limiting as the housing unit could be comprised of multiple parts joined together. For example, in one embodiment, the housing unit output shoulder 25 could be a separate part attached to the housing unit through attachment means such as through corresponding threading which would allow the housing unit output shoulder to screw into or onto the housing unit.

Figure 3:
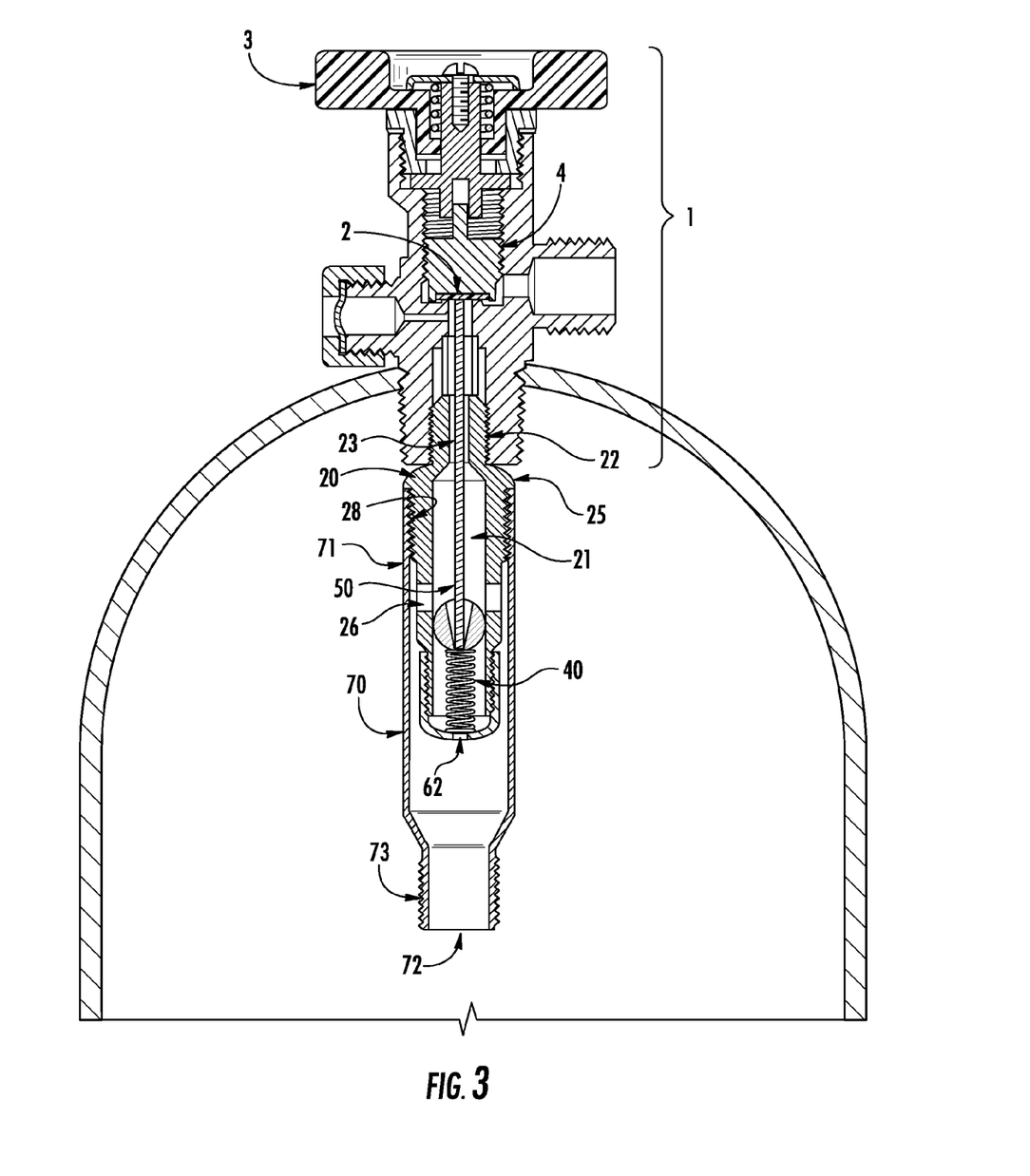
FIG. 3 is a cross sectional view of one embodiment of the safety valve device with the plug in an inactivated position.

Turning to FIG. 3, housing unit 20 is generally tubular in shape and is capable of attaching to an access port 6 of a compressed gas tank 8 through securing means to compressed gas tank or primary valve 22 in such a manner that the housing unit and thus the safety valve device extends inwardly into the compressed gas tank. Indeed, in at least one embodiment, the entirety of housing unit 20 is located inside the compressed gas tank during operation. Housing unit 20 is likewise also capable of connecting to a primary valve 1 through securing means to compressed gas tank and primary valve 22. In the depicted embodiment, securing means to compressed gas tank and primary valve 22 comprises external threading around gas output port 23 which mates with the corresponding internal threading on the access port of the compressed gas tank 8 and/or primary valve 1. Multiple means and arrangements of attaching or mounting the housing unit to the compressed gas tank 8 and/or the primary valve 1 are possible, including, but not limited to, welding the housing unit to the tank or using fasteners which would allow for a substantial seal between the housing unit and either the compressed gas tank or the primary valve such that gases cannot pass through the seal. The housing unit can connect directly or indirectly to a compressed gas tank. For example, the housing unit could connect indirectly to a compressed gas tank such as through an adapter. FIG. 3 depicts an embodiment of indirect connection to a compressed gas tank wherein the housing unit connects directly to primary valve 1 and indirectly to compressed gas tank 8. However, it remains possible that the housing unit could connect directly to both a valve and to a compressed gas tank or that it could connect indirectly to either or both a valve and a compressed gas tank such as through an adapter piece.

As seen in FIGS. 2-6, housing unit 20 of the depicted embodiments has a generally tubular or cylindrical shape. The housing unit 20 is capable of comprising various forms, each of which comprises at least one intake to allow for the contents of the tank to enter the housing unit and a gas output port 23 to allow for the output stream to pass out from the housing unit 20 to the ambient atmosphere. In the depicted embodiment, housing unit 20 is a cylindrical housing unit which comprises a top housing unit gas output port 23, a bottom housing unit intake port 24, and at least one side intake port 26 on the sides of the housing unit. Depending on the shape of the housing unit and the desired flow rate, multiple configurations for the intake ports are possible so long as the following two requirements are met. First, the intake port(s) and the outlet or output port(s) are configured such that a gas channel such as housing unit gas channel 21 is formed which allows for the output stream to flow from the tank and through the output port of the housing unit and access port of the compressed gas tank. Second, the intake ports must be positioned in a manner such that when the plug is activated, a controlled bleed off is achieved. Therefore, in a simpler design, it is possible for the housing unit to comprise an outlet on the top end of the housing unit and a single intake on the bottom end of the housing unit. However, in more complex designs such as those depicted in FIGS. 2-4, the housing unit comprises multiple intake ports, allowing for an alteration in output flow rate.

As stated, the housing unit could comprise multiple different shapes so long as the plug housed inside the housing unit is capable of moving from an inactivated position to an activated position and is also capable of forming at least a partial seal inside the housing unit when the plug is in the activated position. In the depicted embodiment, the housing unit 20 is a tubular housing unit, at least one portion of the housing unit is diametrically larger than the plug 30, and the housing unit has a reduced diameter portion which forms housing unit output shoulder 25 that is diametrically smaller than the diameter of the plug. By way of illustrating some of the diverse configurations possible, in another embodiment, the housing unit could be a cylindrical housing unit, at least one part of the housing unit is diametrically larger than the plug to allow for the plug to move between the inactive and activated positions, the housing unit has a reduced diameter portion referred to generically as a shoulder which is diametrically smaller than the diameter of the plug such that when the plug is activated, the plug will come into contact with the shoulder, create at least a partial seal with the shoulder and allow for a controlled bleed off of the output stream. In the depicted embodiments, housing unit 20 is diametrically smaller than the access port 6 on the compressed gas tank 8 to allow for installation or removal of the housing unit 20. In the depicted embodiment, the housing unit 20 has a portion that is diametrically larger than the diameter of each of the plug 30, actuator spring 40, and actuating rod 50, and a portion that is diametrically reduced such that it is diametrically smaller than the diameter of the plug 30. When in the activated position, plug 30 forms at least a partial seal with housing unit output shoulder 25, the diametrically reduced portion, to achieve a controlled bleed off of the output stream.

In the embodiments as depicted in FIGS. 2-5, housing unit 20 comprises several attachment means including securing means to compressed gas tank or primary valve 22, housing unit securing means to cap 27, and housing unit securing means to gas mixing tube adapter 28. As depicted, each of the attachment or securing means encompass external threading which corresponds to internal threading on a respective object. Therefore, in the particularly depicted embodiment, housing unit 20 has three sets of external threading broken down into a top external threading (securing means to compressed gas tank or primary valve 22), a middle external threading (housing unit securing means to gas mixing tube adapter 28), and a bottom external threading (housing unit securing means to cap 27). Multiple means other than the use of corresponding threading could be utilized which would function to attach the housing unit to the various objects identified herein. For example, several of the attachment means could be welded together or different types of fasteners could be utilized. Only the connections which create a channel between the contents of the compressed gas tank and the atmosphere or objects located outside the compressed gas tank are required to be substantially sealed as to prevent gas from leaking out of the tank.

Thus, in the depicted embodiment, only securing means to compressed gas tank or primary valve 22 need be so sealed. Furthermore, the corresponding threading could be switched such that, in another embodiment, either or both the top and bottom threading could be internal threading which correspond with external threading on the objects to which the housing unit is to be attached.

Depending on the intended use, multiple configurations for the attachment or securing means could be utilized aside from the top, middle, and bottom classifications mentioned above. For example, when deemed unnecessary for an intended use, certain securing means could be omitted entirely; or, if deemed necessary, additional attachment means could be included either to the housing unit itself or to an adapter attached to the housing unit. As depicted, the housing unit comprises an attachment means which allows for the housing unit to attach to a compressed gas tank and/or to a control valve via threading which corresponds to threading on the object to which the housing unit is to be attached. To accomplish this attachment, the housing unit is externally threaded on the output end to allow for connection to an internally threaded valve. For direct connection to the tank, the housing unit could be externally threaded on one end to allow for connection of the housing unit to the internal threading of a tank's valve slot. Likewise, the housing unit could be constructed with externally threading on one end to allow for the connection of the housing unit to both a tank and a control valve. The depicted embodiment utilizes a cap 60 with internal threading, the cap securing means to housing unit 61, which attaches to housing unit 20 at or near the bottom gas intake port 24 through the external threading located around bottom gas intake port 24.

It is common in the industry to utilize a mixing tube in a compressed gas tank so as to draw gas from various points in the tank. To accomplish this use, the depicted safety valve device comprises a housing unit 20 with housing unit securing means to gas mixing tube adapter 28. The gas mixing tube adapter 70 has threading, gas mixing tube adapter securing means to housing unit 71, which corresponds with the securing means to gas mixing tube adapter 28, securing the gas mixing tube adapter 70 to housing unit 20. Gas mixing tube adapter 70 comprises a gas mixing tube adapter securing means to gas mixing tube 73 (depicted as internal threading) through which a gas mixing tube can be attached to the gas mixing tube adapter 70. Once attached the gas mixing tube adapter is attached to the housing unit 20 through the aforementioned securing means and acts as a sheath covering the gas intake ports (24 and 26) of the housing unit. Thus, gas from the gas mixing tube enters the gas mixing tube adapter 70 whereby it is capable of entering the housing unit 20 through gas intake ports 24 or 26. In yet another embodiment, the housing unit is externally threaded to allow for the direct connection of a mixing tube to the housing unit without the need for the adapter.

Figure 4:
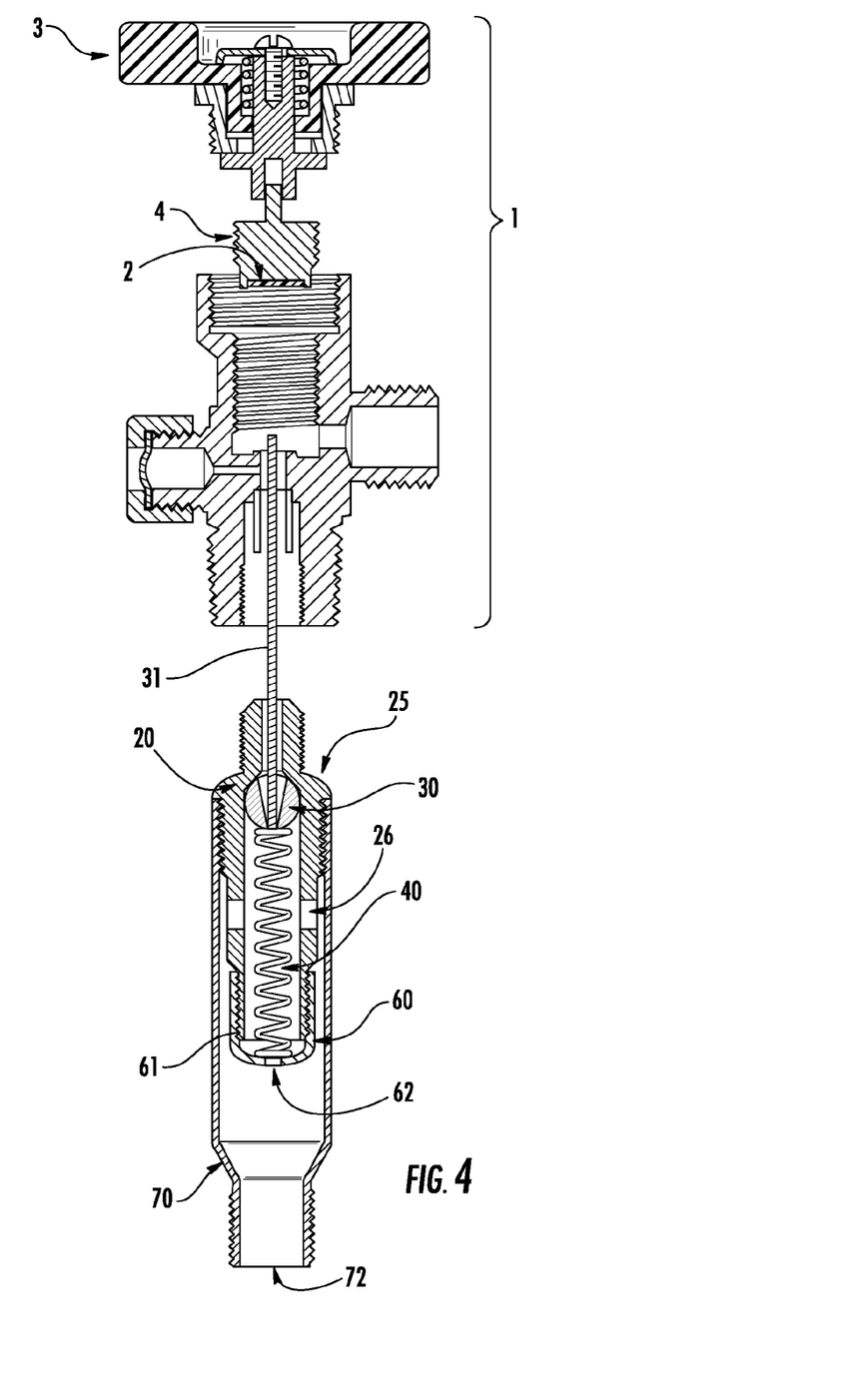
FIG. 4 is a cross sectional view of the same embodiment of the safety valve device as is depicted in FIG. 3 with the plug in an activated position, creating a controlled bleed off of the compressed gas tank's contents.

Plug 30 is a ball or spool valve into which channels have been bored that act as a controlled bleed off vein when plug 30 is in the activated position. When in the activated position, plug 30 contacts housing unit output shoulder 25 in a manner such as to form at least a partial seal with housing unit output shoulder 25 restricting the flow of the output stream from the tank through housing unit gas channel 21 and out gas output port 23. Thus, when plug 30 is in the activated position wherein plug 30 forms at least a partial seal with housing unit output shoulder 25, at least a portion of gas output port 23 will be blocked by plug 30. This partial seal will cause the output stream to flow through the controlled bleed off veins in plug 30. These controlled bleed off veins are represented in FIGS. 3 and 4 by single controlled bleed off vein 31 and in FIG. 5 by multiple input controlled bleed off vein 32. The controlled bleed off channels formed by single controlled bleed off vein 31 and by multiple input controlled bleed off vein 32 are diametrically smaller than gas output port 23. Therefore, the output stream exiting through the controlled bleed off veins would exit via a controlled bleed off, eliminating many of the physical dangers discussed previously in the Background section. It is important to note that the controlled bleed off veins could be formed in various configurations and could be constructed based on the desired rate of a controlled bleed off. For example, if a user would require a faster rate of bleed off for a larger tank, a greater quantity of controlled bleed off veins could be formed in the plug to allow for the increased rate. The only requirement for the controlled bleed off vein(s) is that a controlled bleed off channel is formed through the plug when the plug is in the activated position.

It should also be noted that there is no requirement for plug 30 to be spherical in shape as it is depicted in the Figures. Rather, plugs of any of a multitude of shapes including, but not limited to, cubes, cylinders, pyramids, and discs could be used so long as the plugs are (1) capable of allowing a normal output stream flow when in an inactivated position and (2) capable of facilitating a controlled bleed off of the output stream when in the activated position.

Actuating rod 50 has two opposing ends. A first end of actuating rod 50 extends into the primary valve 1 wherein it contacts or abuts valve seat 2. The second, opposing end of actuating rod 50 extends into housing unit 20 through gas output port 23 wherein it enters but does not pass through the controlled bleed off veins 31 or 32 in plug 30. Depending on the contents of the tank, actuating rod 50 may be a non-corrosive medal rod. The depicted actuating rod 50 is a metallic rod that contacts valve seat 2 on one end and pierces but does not pass fully though plug 30 on the other end; however, multiple embodiments for the actuating rod could be used. For example, the actuating rod could be of any of a number of materials which (1) is capable of withstanding and countering the force exerted on plug 30 by actuator spring 40 and/or the output stream during normal use, and (2) will not detrimentally react with the contents of the compressed gas tank. Therefore, various metals, plastics, glass, and other substances can be used to form the actuating rod. Furthermore, it is also conceivable that at least one end of the actuating rod have some sort of stopper or catching mechanism which is used to aid in maintaining the contact between the actuating rod 50 and either plug 30 or valve seat 2 during normal operation when the plug 30 is in the inactivated position. For example, the end of the actuating rod 50 which contacts valve seat 2 could have a flat platform-like structure attached to it to aid in maintaining the contact between the valve seat 2 and the actuating rod 50. Some sort of adhesive could likewise be used to keep the actuating rod 50 in contact with valve seat 2.

Several different embodiments for the end of the actuating rod which contacts the plug could also be used. As depicted, the end of the actuating rod 50 pierces the plug 30 but does not pass all the way through the plug 30. This is possible without additional components because of the configuration of single controlled bleed off vein 31 and multiple controlled bleed off vein 32. In the single controlled bleed off vein 31 configuration, the controlled bleed off vein comprises a reduced diameter on the side facing the input port such as to prevent the actuating rod 50 from passing through the plug. Likewise, the T-shaped configuration of multiple controlled bleed off vein 32 creates a platform in the plug 30 upon which the plug end of the rod rests during normal operation. In another embodiment, however, it is conceivable that the rod would pierce entirely through the plug, but that the rod would have some sort of stopping means which would allow for it to catch the plug and thus counter the actuating force exerted by the actuator. In yet another embodiment, the actuating rod comprises a stopper near the end such that the end can pierce the plug by entering a controlled bleed off vein in the plug, but the stopper ensures that the actuating rod does not pass entirely through the plug. In yet another embodiment, one end of the actuating rod will have a stopper which is capable of allowing for sufficiently secure contact between the actuating rod and the plug such that the actuating rod can counter the force exerted on the plug by the spring without piercing the plug. In yet another embodiment, one end of the actuating rod will be shaped in a manner such as to compliment the shape of the plug such that the actuating rod can securely contact the plug in a manner so as to counteract the force exerted by the spring on the plug without piercing the plug. For example, in the depicted embodiment, the plug 30 is a spherical plug or spool valve. An actuating rod could be utilized which has a concave, semi-circular end which is capable of cupping the plug so as to provide the contact necessary to allow the actuating rod to counter the force exerted by the spring on the plug. Please note, the actuating rod 50 only counters the force of the actuator spring 40 on plug 30 when the primary valve 1 is attached to the housing unit 20, either directly or indirectly. If the primary valve 1 were to be detached from the housing unit 20, countering force provided by the valve seat 2 through actuating rod 50 would cease countering the force exerted upon the plug 30 by actuator spring 40, allowing the force of actuator spring 40 to plug 30 into the activated position.

As previously stated, when the plug is in the inactivated position, plug 30, actuator spring 40, and a portion of actuating rod 50 are housed inside housing unit 20 in a manner such that plug 30 is situated between actuator spring 40 and gas output port 23 such that the force exerted by actuator spring 40 onto plug 30 would push plug 30 into the activated position if the countering force exerted on plug 30 by valve seat 2 through actuating rod 50 were to cease. Cap 60 connects to housing unit 20 through cap securing means to housing unit 61 and corresponding housing unit securing means to cap 27. Cap 60 acts as a platform which supports actuator spring 40 such that actuator spring 40 can exert a force on plug 30 to move plug 30 to the activated position. In order to allow for gas to pass through bottom gas intake port 24, cap 60 comprises cap intake port 62 as most clearly depicted in FIG. 2.

Figure 6:
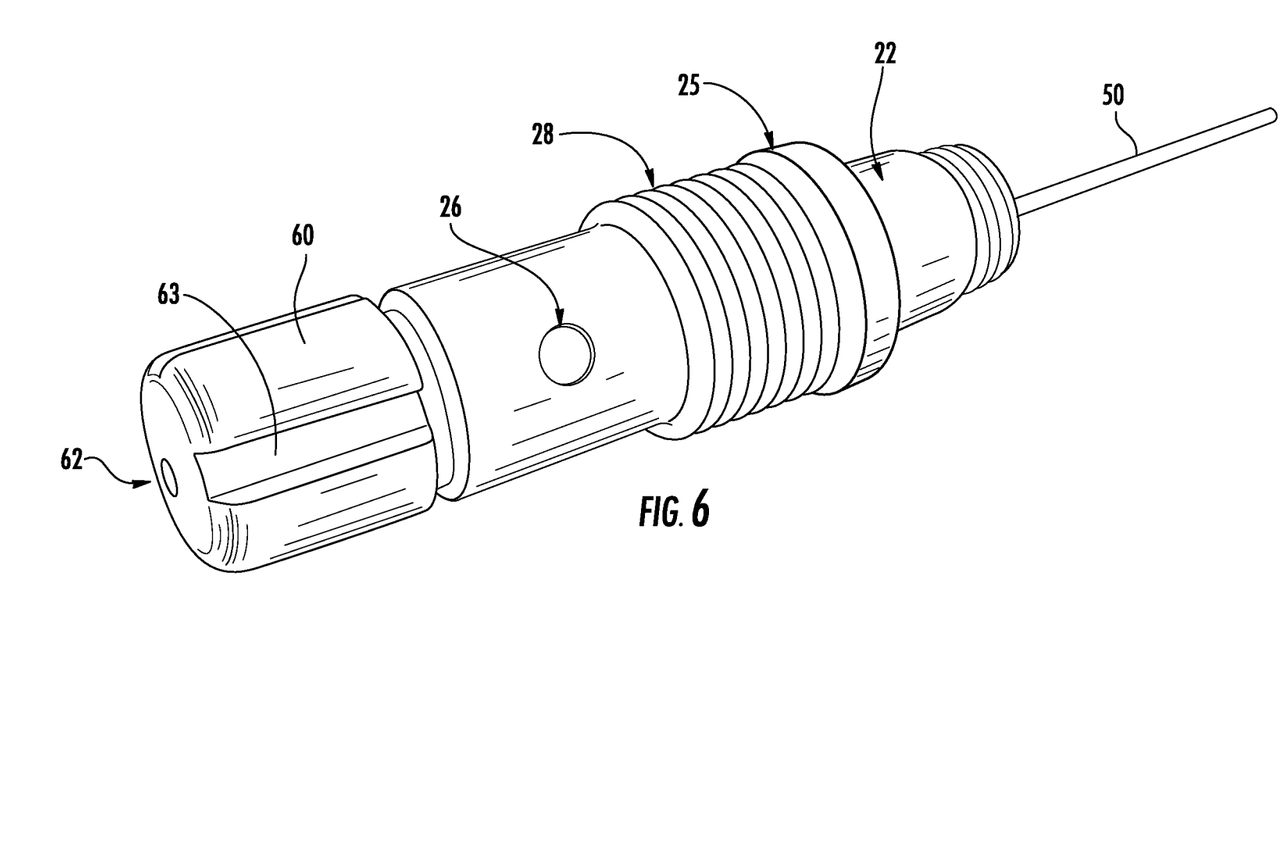
FIG. 6 depicts an external side view of the housing unit attached to a cap.

Multiple configurations for the cap 60 could be used. If a compressed helical spring is used or any similar variant of a compression spring or other similar device as actuator spring 40, any other platform upon which the spring can rest and exert the required force to push the plug 30 into the activated position will suffice. In one such embodiment, the housing unit would comprise a gas channel, at least one intake, an output port or outlet, and a platform with a cross section upon which the spring can rest such that it is capable of exerting a force on the plug to activate the plug. Turning to FIGS. 2 and 6, there is, generally a cap 60 which provides a platform upon which the spring can rest such that it is capable of exerting a force on the plug to activate the plug and wherein the platform is capable of allowing the contents of the tank to pass there through. To fulfill these functions, cap 60 generally comprises cap securing means to housing unit 61, cap gas intake port 62, and cap socket(s) 63. Cap sockets 63 allow for the use of tools such as a spanner wrench to secure the cap 60 to housing unit 20. Once cap 60 is secured to housing unit 20, the sockets can then be used to secure the joined housing unit 20 and cap 60 structure to either the tank or the valve. Furthermore, the channels which comprise cap sockets 63 allow gas entering through the mixing gas tube to flow more readily to side gas intake ports 26.

In an additional embodiment, the mechanical actuator such as actuator spring 40 could be an elongated helical spring which is located between the gas output port and the plug such that the spring would pull the plug into the activated position when the actuating rod ceases to counteract the force exerted upon the plug by the spring. In such an embodiment, no platform would be required underneath the plug; rather, the spring would be connected or attached to the plug and the housing unit in a manner to allow the spring to pull the plug into the activated position.

When the plug is in the inactivated position, actuator spring 40 is a compressed helical compression spring. When the countering force provided through actuating rod 50 and valve seat 2 ceases, such as when primary valve 1 is separated from the housing unit, the normally contracted spring expands, pushing the plug into the activated position. Multiple types of compression springs are capable of being used. Likewise, the spring can be made out of many different types of metals so long as the metals do not react with the contents of the tank. For example, depending on the configuration of the plug and the contents of the tank, the spring may be a tapered spring and may be a non-corrosive compression spring.

How the Component Parts Work

During normal operation, a primary valve 1 is attached to the compressed gas tank 8 at a compressed gas tank access port 6. Under normal operation, one end of actuating rod 50 would be located inside the primary valve wherein the end of the actuating rod will contact valve seat 2. The other end of actuating rod 50 will extend into housing unit 20 and contact plug 30 as described above. Thus, in normal operations, the resistance and countering force on the plug 30 provided by valve seat 2 through actuating rod 50 prevents the actuator such as actuator spring 40 and the output stream from pushing plug 30 into the activated position. It is the resistance by valve seat 2 through actuating rod 50 which effectively blocks the plug from moving to the activated position when primary valve 1 remains secured to either the access port of the compressed gas tank, the safety valve device, or both.

Therefore, in normal operations, the output stream is capable of flowing from the tank, into housing unit gas channel 21 of housing unit 20 through side gas intake ports 26 and bottom gas intake port 24. Please note, if gas mixing tube adapter 70 is attached to housing unit 20, the output stream will flow through gas mixing tube (not depicted) into the chamber formed between gas mixing tube adapter 70 and housing unit 20 before the output stream enters housing unit gas channel 21 through side gas intake ports 26 and bottom gas intake port 24. Once the output stream has entered the gas channel 21 of housing unit 20, the output stream is capable of unrestrictedly leaving gas channel 21 past housing unit output shoulder 25 and through gas output port 23. From gas output port 23, the gas flows into primary valve 1. One having ordinary skill in the art would recognize means by which the gas flows out primary valve 1 as well as the multitude of uses for the exiting gas.

Figure 5:
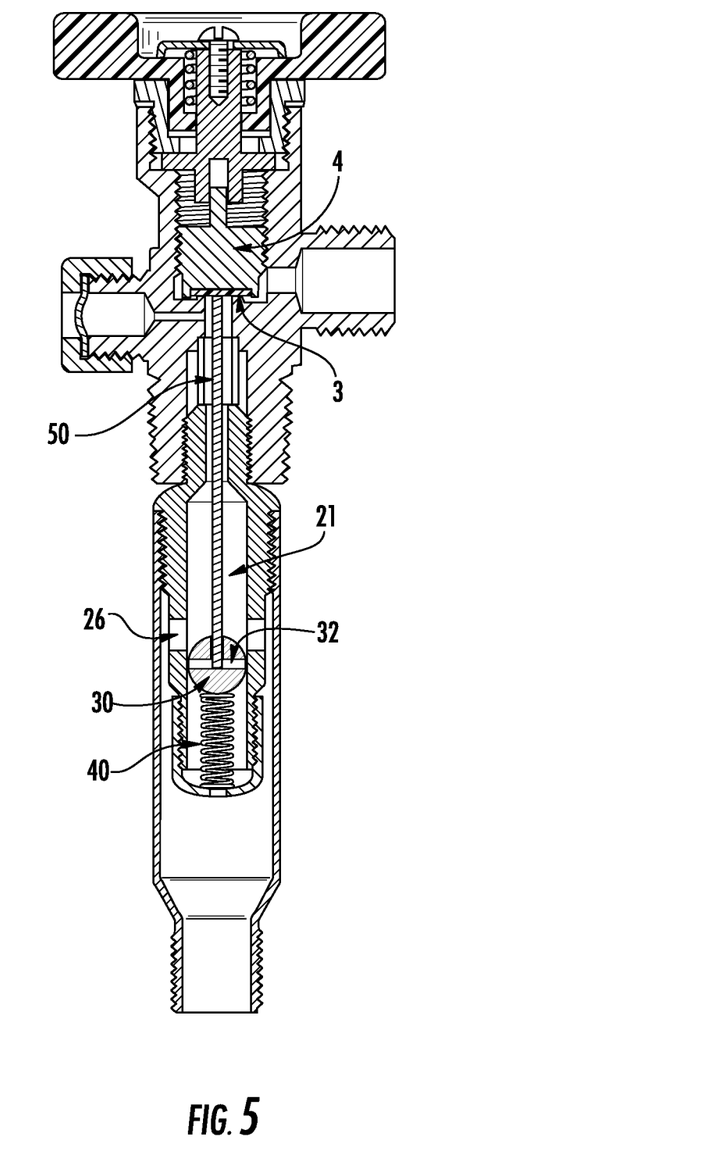
FIG. 5 is a cross sectional view of one embodiment of the safety valve device depicting another embodiment of a plug which is in an inactivated position.

In the event that primary valve 1 is separated from the compressed gas tank in any fashion, the resistance or countering force exerted by valve seat 2 on plug 30 through actuating rod 50 will cease. Thus, if such separation occurs, actuator spring 40 will move plug 30 from the inactivated position into the activated position wherein plug 30 contacts and forms at least a partial seal with housing unit output shoulder 25, diminishing the rate of the output stream flow through housing unit gas channel 21 and out gas output port 23. Although actuator spring 40 is the primary means of moving plug 30 into the activated position in contact with housing unit output shoulder 25, the output stream moving through housing unit gas chamber 21 from bottom gas intake port 24 and side intake ports 26 also aids in moving the plug 30 into the activated position as well as in holding the plug in the activated position. The gas passing through bottom intake port 24 will form a stream which will help push and direct plug 30 towards gas output port 23. As previously stated, in one embodiment, side intake ports 26 are bored or otherwise formed through the sides of housing unit 20 at an angle such that the gas streams passing through side intake ports 26 are directed towards housing unit output port. Therefore, once plug 30 passes side intake ports 26 on the way to its activated position in contact with housing unit output shoulder 25, plug 30 will be further pushed into the activated position by the combined gas streams which enter housing unit gas chamber 21 through side intake ports 26. Once plug 30 is in the activated position, actuator spring 40 and previously discussed gas streams aid in holding plug 30 in the activated position. With plug 30 in the activated position, at least a portion of the output stream can only exit housing unit 20 by passing through the controlled bleed off veins (depicted as 31 or 32) in the plug. The combined channels which comprise controlled bleed of veins 31 or 32 have a smaller diameter than the diameter of gas output port 23. For this reason, the flow rate of the output stream traveling from the compressed gas tank through the controlled bleed off veins 31 or 32 in plug 30 is reduced as compared to the unhindered flow rate of the output stream wherein the plug is not in the activated position. Therefore a controlled bleed off channel is formed between the contents of the compressed gas tank and the ambient atmosphere. As shown in FIGS. 3-5 and discussed herein, multiple variations on the configuration and number of controlled bleed off veins in plug 30 could be used to further control the flow rate of the output stream in the event the primary valve 1 is separated from a compressed gas tank.

Additional components can be added to the safety valve device which allows the device to act more efficiently even when the plug is in the inactivated position. For example, as depicted in the figures, gas mixing tube adapter 70 can be attached to housing unit 20 through housing unit securing means to gas mixing tube adapter 28. In this particular embodiment, the securing means used are the internal threading on gas mixing tube adapter 70 which correspond to the external threading which comprise housing unit securing means to gas mixing tube adapter 28. As previously stated, additional forms of fasteners and securing means could be utilized to attach the gas mixing tube adapter to the housing unit. Furthermore, the location at which the gas mixing tube adapter is attached to the housing unit could differentiate from what is depicted depending on the number and location of the housing unit intake ports. As seen in the embodiment in FIGS. 1, 3, 4, and 5, the gas mixing tube adapter 70 attaches to the housing unit in a manner such that it creates a sheath around the housing unit input ports that the gas entering the gas mixing tube (not depicted) is capable of passing through the intake ports (24, 26, or both 24 and 26) of the housing unit. Cap sockets 63 are utilized to aid in directing the incoming output stream from the gas mixing tube to the side gas intake ports 26.

For the purpose of understanding the safety valve device, references are made in the text to exemplary embodiments of a safety valve device, only some of which are described herein. It should be understood that no limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the safety valve device may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change to the basic function to which it is related.

PARTS LIST

1—Primary Valve
2—Valve Seat
3—Valve Handle
4—Valve Nut
5—Valve Output Port
6—Compressed gas tank access port
7—Valve Relief Device
8—Compressed Gas Tank
20—Housing Unit
21—Housing Unit Gas Channel
22—Securing Means to Compressed Gas Tank or Primary Valve 23—Gas Output Port
24—Bottom Gas Intake Port
25—Housing Unit Output Shoulder
26—Side Gas Intake Port
27—Housing Unit Securing Means to Cap
28—Housing Unit Securing Means to Gas Mixing Tube Adapter
30—Plug
31—Single Controlled Bleed off Vein
32—Multiple Controlled Bleed off Vein Configuration
40—Actuator Spring
50—Actuating rod
60—Cap
61—Cap Securing Means to Housing Unit
62—Cap Gas Intake Port
63—Cap Sockets
70—Gas Mixing Tube Adapter
71—Gas Mixing Tube Adapter Securing Means to Housing Unit
72—Gas Mixing Tube Adapter Intake Port
73—Gas Mixing Tube Adapter Securing Means to Gas Mixing Tube

I claim:

1. A valve device comprising:
   a. A housing unit;
   b. A plug located inside said housing unit which is capable of moving from an inactivated position to an activated position, wherein the plug comprises at least one controlled bleed off vein which allows for a controlled bleed off of an output stream when the plug is in the activated position;
   c. at least one actuating rod; and,
   d. at least one actuator,
   e. wherein said housing unit is in fluid communication with an access port on a storage vessel for gas that is not flammable and
   f. wherein the housing unit comprises at least two inlet ports and an output port, wherein at least one inlet port is located on one end of the housing unit, the output port is located on the opposing end of the housing unit, and at least one inlet port is located on the side of the housing unit, and wherein a gas channel is formed between said inlet ports and said output port.

2. The valve device as in claim 1, wherein the actuator is a spring.

3. The valve device as in claim 1, wherein the housing unit is structurally capable of withstanding the pressure exerted upon the housing unit by the output stream.

4. The valve device as in claim 1, wherein the housing unit comprises a material chosen from a group consisting of brass, copper, aluminum, iron, steel, stainless steel, graphite, platinum, titanium, silver, lead, silicon bronze, manganese bronze, cadmium, zinc, magnesium, and alloys of any of the foregoing.

5. The valve device as in claim 1, wherein the housing unit is capable of being removably connected to an access port of a pressurized gas tank.

6. The valve device as in claim 1, wherein the housing unit is capable of being connected to a valve.

7. The valve device as in claim 1, wherein the housing unit is capable of being connected to a gas mixing tube.

8. The valve device as in claim 1, wherein a cap is attached to said housing unit at the inlet end via attachment means, wherein the cap comprises an inlet port and at least two external sockets.

9. The valve device as in claim 1, wherein the housing unit is connected to a gas mixing tube through an adapter such that the gas mixing tube is in fluid connection with said at least one inlet port through said adapter.

10. The valve device as in claim 1, wherein the plug comprises multiple controlled bleed off veins.

11. The valve device as in claim 1, wherein the plug comprises at least one controlled bleed off vein wherein the at least one controlled bleed off vein comprises at least two inlet ports and at least one output port.

12. The valve device as in claim 1, wherein the plug comprises at least one controlled bleed off veins wherein said at least one controlled bleed off vein comprises at least one inlet port, at least one output port, and a gas channel in the plug between said at least one inlet port and said at least one output port, wherein an output stream can enter the plug through said at least one inlet port and out through said output port.

13. The valve device as in claim 1, wherein gas entering the housing unit through at least one inlet port acts as an actuator on the plug.

14. A valve device comprising:
   a. A housing unit;
   b. A plug located inside said housing unit which is capable of moving from an inactivated position to an activated position, wherein the plug comprises at least one controlled bleed off vein which allows for a controlled bleed off of an output stream when the plug is in the activated position;
   c. at least one actuating rod; and,
   d. at least one actuator,
   e. Wherein said housing unit is capable of being attached either directly or indirectly to an access port on a compressed gas tank, wherein a valve is attached, directly or indirectly, to said access port during normal operation, wherein the housing unit comprises at least one housing unit intake port and a housing unit output port, wherein said housing unit depends into the container from the access port in a manner such that the housing unit output port is in fluid communication with the access port, wherein said housing unit further comprises a gas passageway through which an output stream can pass from the container into the housing unit through said at least one housing unit intake port and out through the housing unit output port and access port on the container;
   f. Wherein said plug is capable of being moved from an inactivated position to an activated position, wherein said plug is capable of forming at least a partial seal when said plug is in the activated position, at least partially restricting the flow of the output stream exiting the housing unit through the housing unit output port;
   g. Wherein said actuator is a spring which is positioned such that said actuator is capable of exerting the requisite moving force on the plug to activate the plug from the inactivated position to the activated position; and
   h. Wherein said actuating rod comprises two ends wherein during normal operation, a first end of the actuating rod contacts a component of the valve, either directly or indirectly, and wherein the second end of the rod projects into said housing unit wherein said second end contacts said plug, preventing the actuator from moving the plug into the activated position.

15. A gas regulation system comprising:
   a. a compressed gas regulator valve comprising an inlet port, an output port, a gas channel connecting said inlet port and said output port, and a regulator; and b. a safety valve device comprising a housing unit, a plug, at least one actuating rod, and at least one actuator, wherein said plug is capable of being moved from an inactivated position to an activated position by the at least one actuator, wherein the plug comprises at least one controlled bleed off vein which allows for a controlled bleed off of an output stream when the plug is in the activated position;

c. wherein said safety valve device is attached to said compressed gas regulator valve during normal operation and the safety valve device and regulator valve capable of being removably connected to each other and to an access port of a compressed gas tank whose contents are not flammable and wherein the housing unit comprises at least two inlet ports and an output port, wherein at least one inlet port is located on one end of the housing unit, the output port is located on the opposing end of the housing unit, and at least one inlet port is located on the side of the housing unit, and wherein a gas channel is formed between said inlet ports and said output port.

16. The gas regulation system as claimed in claim 15, wherein the actuator is a spring.

17. The gas regulation system as claimed in claim 15 wherein the actuating rod has two ends, a first end and a second end, wherein during normal operation when the safety valve device and the regulator valve are connected to each other, either directly or indirectly, the first end of the rod contacts a component of the regulator valve and the second end contacts the plug, countering the activating force exerted on the plug by the actuator such that if the safety valve device were to separate from the regulator valve, the rod would cease to counter the activating force and the plug would be moved into the activated position by the actuator.

18. The gas regulation system as claims in claim 17 wherein the actuator is a spring.

19. The gas regulation system as claimed in claim 15, wherein the housing unit is structurally capable of withstanding the pressure exerted upon the housing unit by the output stream.

20. The gas regulation system as claimed in claim 15, wherein the housing unit is constructed of a material chosen from a group consisting of brass, copper, aluminum, iron, steel, stainless steel, graphite, platinum, titanium, silver, lead, silicon bronze, manganese bronze, cadmium, zinc, magnesium, and alloys of any of the foregoing.

21. The gas regulation system as claimed in claim 15, wherein the housing unit is capable of being connected to a mixing tube, either directly or through an adapter.

22. The gas regulation system as claimed in claim 15, wherein the plug comprises multiple controlled bleed off veins.

23. The gas regulation system as claimed in claim 15, wherein the plug comprises a controlled bleed off veins further comprising at least two inlet ports and at least one output port.

24. The gas regulation system as claimed in claim 15, wherein the plug comprises at least one controlled bleed off vein wherein said at least one controlled bleed off vein comprises at least one inlet port, at least one output port, and a gas channel in the plug between said at least one inlet port and said at least one output port, wherein an output stream can enter the plug through said at least one inlet port and out through said output port.

25. A valve device comprising:
a. A housing unit;
b. A plug located inside said housing unit which is capable of moving from an inactivated position to an activated position, wherein the plug comprises at least one controlled bleed off vein which allows for a controlled bleed off of an output stream when the plug is in the activated position;
c. at least one actuating rod; and,
d. at least one actuator,
e. wherein said housing unit is in fluid communication with an access port on a storage vessel for gas that is not flammable and said housing unit is in further fluid communication with a valve; wherein at least one actuator is a spring positioned so as to be capable of exerting the requisite moving force to activate the plug from the inactivated position to the activated position; and wherein at least one actuating rod comprises two ends, one end contacting a component of the valve and another end contacting the plug to prevent the actuator from moving the plug into the activated position when the housing unit is connected to the valve.

26. The valve device as claimed in claim 25, wherein said housing unit comprises at least one inlet port and at least one output port, a gas channel connects said at least one inlet port and one output port such that an output stream can flow through said housing unit.

27. The valve device as claimed in claim 26, wherein the housing unit is connected to a gas mixing tube through an adapter such that the gas mixing tube is in fluid connection with said at least one inlet port through said adapter.

28. The valve device as claimed in claim 26, wherein gas entering the housing unit through at least one inlet port also acts as an actuator on the plug.

29. The valve device as claimed in claim 25, wherein the housing unit comprises at least two inlet ports and an output port, wherein at least one inlet port is located on one end of the housing unit, the output port is located on the opposing end of the housing unit, and at least one inlet port is located on the side of the housing unit, and wherein a gas channel is formed between said inlet ports and said output port.

30. The valve device as claimed in claim 29, wherein a cap is attached to said housing unit at the inlet end via attachment means, wherein the cap comprises an inlet port and at least two external sockets.

31. The valve device as claimed in claim 25, wherein the housing unit comprises a material chosen from a group consisting of brass, copper, aluminum, iron, steel, stainless steel, graphite, platinum, titanium, silver, lead, silicon bronze, manganese bronze, cadmium, zinc, magnesium, and alloys of any of the foregoing.

32. The valve device as claimed in claim 25, wherein the housing unit is capable of being removably connected to an access port of a pressurized gas tank.

33. The valve device as in claim 25, wherein the housing unit is capable of being connected to a gas mixing tube.

34. The valve device as claimed in claim 25, wherein the plug comprises multiple controlled bleed off veins.

35. The valve device as claimed in claim 25, wherein the plug comprises at least one controlled bleed off vein, wherein at least one controlled bleed off vein comprises at least two inlet ports and at least one output port.

36. The valve device as claimed in claim 25, wherein the plug comprises at least one controlled bleed off vein wherein said at least one controlled bleed off vein comprises at least one inlet port, at least one output port, and a gas channel in the plug between said at least one inlet port and said at least one output port, wherein an output stream can enter the plug through said at least one inlet port and out through said output port.

37. A gas regulation system comprising:
  a. A compressed gas regulator valve comprising an inlet port, an output port, a gas channel connecting said inlet port and said output port, and a regulator;
  b. A safety valve device comprising a housing unit, a plug, at least one actuating rod, and at least one actuator, wherein said plug is capable of being moved from an inactivated position to an activated position by the at least one actuator, wherein the plug comprises at least one controlled bleed off vein which allows for a controlled bleed off of an output stream when the plug is in the activated position; and
  c. Wherein said safety valve device is attached to said compressed gas regulator valve during normal operation and the safety valve device and regulator valve capable of being removably connected to each other and to an access port of a compressed gas tank whose contents are not flammable, and wherein the actuating rod has two ends, a first end and a second end, wherein during normal operation when the safety valve device and the regulator valve are connected to each other, either directly or indirectly, the first end of the rod contacts a component of the regulator valve and the second end contacts the plug, countering the activating force exerted on the plug by the actuator such that if the safety valve device were to separate from the regulator valve, the rod would cease to counter the activating force and the plug would be moved into the activated position by the actuator.

38. The gas regulation system as claimed in claim 37, wherein the actuator is a spring.

39. The gas regulation system as claimed in claim 37, wherein said housing unit comprises at least one inlet port and at least one output port, a gas channel connects said at least one inlet port and one output port such that an output stream can flow through said housing unit.

40. The valve device as claimed in claim 39, wherein a gas mixing tube is capable of being attached to the housing unit such that gas from the mixing tube can enter into the housing unit.

41. The gas regulation system as claimed in claim 37, wherein the housing unit comprises at least two inlet ports, one inlet port located at one end of the housing unit, an output port on the opposing end of the housing unit, and one inlet port on the side of the housing unit, wherein a gas channel connects said at least two inlet ports and said output port.

42. The gas regulation system as claimed in claim 37, wherein the housing unit is constructed of a material chosen from a group consisting of brass, copper, aluminum, iron, steel, stainless steel, graphite, platinum, titanium, silver, lead, silicon bronze, manganese bronze, cadmium, zinc, magnesium, and alloys of any of the foregoing.

43. The gas regulation system as claimed in claim 37, wherein the housing unit is capable of being connected to a mixing tube, either directly or through an adapter.

44. The gas regulation system as claimed in claim 37, wherein the plug comprises multiple controlled bleed off veins.

45. The gas regulation system as claimed in claim 37, wherein the plug comprises a controlled bleed off vein further comprising at least two inlet ports and at least one output port.

46. The gas regulation system as claimed in claim 37, wherein the plug comprises at least one controlled bleed off vein, wherein said at least one controlled bleed off vein comprises at least one inlet port, at least one output port, and a gas channel in the plug between said at least one inlet port and said at least one output port, wherein an output stream can enter the plug through said at least one inlet port and out through said output port.

47. The valve device as claimed in claim 37, wherein gas entering the housing unit through at least one inlet port acts as an actuator on the plug.

\* \* \* \* \*